(12) United States Patent
Sohm et al.

(10) Patent No.: US 7,590,892 B2
(45) Date of Patent: Sep. 15, 2009

(54) METHOD AND SYSTEM OF PROFILING REAL-TIME STREAMING CHANNELS

(75) Inventors: Oliver P. Sohm, Toronto (CA); Brian Cruickshank, Oakville (CA)

(73) Assignee: Texas Instruments Incorporated, Dallas, TX (US)

( * ) Notice: Subject to any disclaimer, the term of this patent is extended or adjusted under 35 U.S.C. 154(b) by 415 days.

(21) Appl. No.: 11/383,470

(22) Filed: May 15, 2006

(65) Prior Publication Data

US 2007/0006173 A1 Jan. 4, 2007

Related U.S. Application Data

(60) Provisional application No. 60/681,427, filed on May 16, 2005, provisional application No. 60/681,542, filed on May 16, 2005.

(51) Int. Cl.
*G06F 11/00* (2006.01)
(52) U.S. Cl. ........................................................ 714/38
(58) Field of Classification Search ................... 714/38
See application file for complete search history.

(56) References Cited

U.S. PATENT DOCUMENTS 5,103,394 A * 4/1992 Blasciak ...................... 714/47
5,450,586 A * 9/1995 Kuzara et al. ............... 717/124
5,848,264 A * 12/1998 Baird et al. ................... 703/28
5,983,366 A * 11/1999 King ........................... 714/38
6,067,588 A * 5/2000 Ito ............................... 710/28
6,154,857 A * 11/2000 Mann .......................... 714/30
6,161,200 A * 12/2000 Rees et al. ................... 714/38
2002/0031086 A1* 3/2002 Welin ......................... 370/229
2002/0091977 A1* 7/2002 Mastro et al. ............... 714/712
2004/0083088 A1* 4/2004 Berent et al. ................. 703/19
2006/0048012 A1* 3/2006 Barton et al. ................ 714/38
2006/0168481 A1* 7/2006 Nemoto ...................... 714/38

* cited by examiner

*Primary Examiner*—Scott T Baderman
*Assistant Examiner*—Yair Leibovich
(74) *Attorney, Agent, or Firm*—Robert D. Marshall, Jr.; Wade J. Brady, III; Frederick J. Telecky, Jr.

(57) ABSTRACT

A method and system of profiling streaming channels. At least some of the illustrative embodiments are methods comprising executing a traced program on a target system (the traced operating on a plurality of streaming channels), obtaining values indicative of which of the plurality of streaming channels the traced program has operated on (the obtaining by a host computer coupled to the target system), and displaying on a display device an indication of a proportion of an execution time the processor of the target system dedicated to each of the streaming channels.

20 Claims, 4 Drawing Sheets

| # | TASK | CHAN | PA | Disas | |
|---|---|---|---|---|---|
| #0 | 1 | 4 | | | |
| #1 | 1 | 4 | 00008CC4 | B.S1 | 0x00d420 |
| #2 | 1 | 4 | 00008CC8 | MVK.S1 | 0x2911, A3 |
| #3 | 1 | 4 | 00008CCC | MVKH.S1 | 0x0000, A3 |
| #4 | 1 | 4 | 00008CCC | MVKH.S1 | 0x0000, A3 |
| #5 | 1 | 4 | 00008CD0 | STW.D2T1 | A3, *+B15[1] |
| #6 | 1 | 4 | 00008CD4 | ADDKPC.S2 | RL11 (PC+3... |
| #7 | 1 | 4 | 00008CD8 | STW.D2T2 | B10, *+B15[2] |
| #8 | 1 | 4 | 00008CDC ‖ | OR.D1 | 0, A11, A4 |
| #9 | 1 | 4 | 0000D420 | B.S2 | LOG_F_even... |
| #10 | 1 | 4 | 00008CE0 | B.S1 | 0x00d180 |
| #11 | 1 | 4 | 00008CE4 | ADDKPC.S2 | RL12 (PC+1... |
| #12 | 1 | 4 | 00008CE4 | ADDKPC.S2 | RL12 (PC+1... |
| #13 | 1 | 4 | 00008CE4 | ADDKPC.S2 | RL12 (PC+1... |
| #14 | 2 | 1 | 00008CE8 | OR.D1 | 0, A10, A4 |
| #15 | 2 | 1 | 00008CEC | OR.D2 | 0, B11, B4 |
| #16 | 2 | 1 | 00008CEC | OR.D2 | 0, B11, B4 |
| #17 | 2 | 1 | 0000D180 | B.S2 | 0x00d1a0 |
| #18 | 2 | 1 | 0000D184 ‖ | LDW.D1T2 | *+A4 [4], B1 |
| #19 | 2 | 1 | 0000D188 ‖ | LDW.D2T1 | *+B14[16], A2 |
| #20 | 2 | 1 | 00008D0C | STW.D2T2 | B3, *15--[2] |
| #21 | 2 | 1 | 00008D10 | B.S1 | 0x00c580 |

Receiver stopped due to buffer full    (eStoppedFull)
Ready

METHOD AND SYSTEM OF PROFILING REAL-TIME STREAMING CHANNELS

CROSS-REFERENCE TO RELATED APPLICATIONS

This application claims the benefit of Provisional Application Ser. No. 60/681,427 filed May 16, 2005, titled "Debugging Software-Controlled Cache Coherence," and Provisional Application Ser. No. 60/681,542, filed May 16, 2005, entitled, "Debug Profiling Applications", both of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data The trace data may comprise data such as the addresses of operational codes (opcodes) executed by the processor and values of various processor registers at each executed instruction.

Some software programs operate on multiple channels of streaming media (e.g., audio streams, video streams). In many real-time systems, there are multiple tasks, each of which runs at a specific frame rate. Each task, in turn, may support multiple channels that run at the frame rate of the task, each channel processing a different stream of input samples and/or generating a different stream of output samples. When debugging such software programs, one may have to identify a set of instructions, operating on a particular channel of a particular task, which are causing unwanted behavior, such as consuming excessive processor time or resources and thus causing degradation of the overall system performance. Some real-time systems have preemptive multi-tasking which allows the system to continue functioning in such situations by preempting a channel that has missed a real-time deadline, but there will often still be unwanted behavior in the form of glitches in the audio stream or dropped or distorted frames of video, for example. However, it is difficult to debug these real-time systems due to the difficulty in differentiating the various tasks and channels from a trace data capture screen, as the instructions from channel-to-channel may be substantially similar, if not identical.

SUMMARY

The problems noted above are solved in large part by a method and system of profiling real-time systems. At least some of the illustrative embodiments are a computer-readable medium a storing programs that, when executed by a processor of a host system, causes the processor to obtain values indicative of which of a plurality of channels have been operated on by a traced program executing in a target system, and display an indication of a proportion of an execution time the processor of the target system dedicated to each of the plurality of channels during the execution time.

Other illustrative embodiments are methods comprising executing a traced program on a target system (the traced program operating on a plurality of streaming channels, which may be operating at different frame rates), obtaining values indicative of which of the plurality of streaming channels the traced program has operated on (the obtaining by a host computer coupled to the target system), and displaying on a display device an indication of a proportion of an execution time the processor of the target system dedicated to each of the streaming channels.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

The term "operating system" shall comprise not only the features and functions packaged with the brand-name operating system, but also may comprise basic input/output system (BIOS) instructions, executives and simple interrupt-driven systems.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
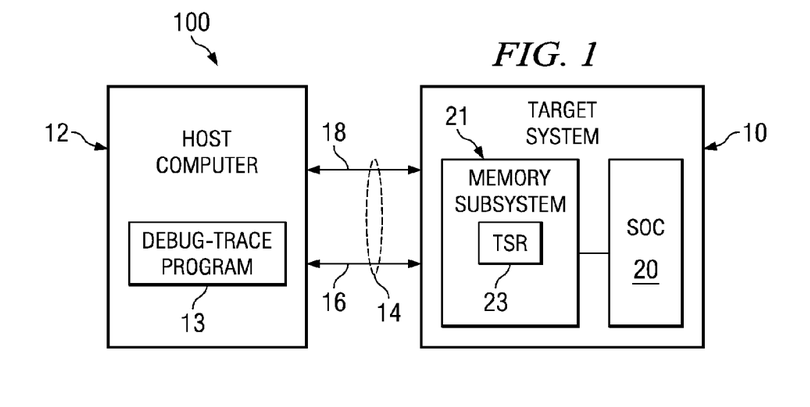
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer 12 stores and executes a program that is used for software debugging (e.g., gather trace data and produce trace displays), and thus is referred to herein as a software debugger program or a debug-trace program 13. In other embodiments, the debug-trace program 13 may execute in the target system 10, and in these embodiments is referred to as an embedded software debugger.

The host computer 12 and target system 10 couple by way one or more interconnects 14, such as cables. In some embodiments, the host computer 12 couples to target system 10 by way of a multi-pin cable 16, such as a Mictor available from Tektronix Texas, LLC of Richardson, Tex. The multi-pin cable 16 enables transfer of trace data from the target system 10 to the host computer 12. In alternative embodiments, the host computer 12 couples to the target system 10 by way of a serial cable 18 across which the host computer 12 may communicate with a serial communication system of target system 10 (e.g., a joint test action group (JTAG) communication system or a serial direct memory accesses (DMA) transfer protocol. Serial communication between the host computer 12 and target system 10 on serial cable 18 has lower bandwidth than a multi-pin connection through illustrative cable 16. Thus, in embodiments that rely exclusively on the communications over serial cable 18, rather than trace or capture every event of a processor within a particular time frame, the statistical sample system (discussed more fully below) of the target system 10 is configured to statistically sample pertinent information, and transfer the statistically sampled data across the serial cable 18. In order to reduce the number of cables required to couple the host computer with the target system, the multi-pin cable 16 may have two or more pins dedicated to serial communication, and thus the host computer 12 and target system 10 may communicate using different protocols, yet over the same multi-pin cable 16. Other embodiments comprise logging the captured trace data in memory or disk that is accessible by the target processor where it can be accessed by another program running on the target processor (e.g., an embedded software debugging program). In yet still other embodiments, the trace data may be captured on the target system and transferred to the host computer by any of a variety of now existing or after developed transport protocols, which allow the host computer to interact over a distance such that the host computer and target system need not be co-located (e.g., Ethernet, transmission control protocol/internet protocol (TCP/IP), institute of electrical and electronic engineers (IEEE) 1391 protocol, RS-232, and peripheral components interconnect (PCI)).

Figure 2:
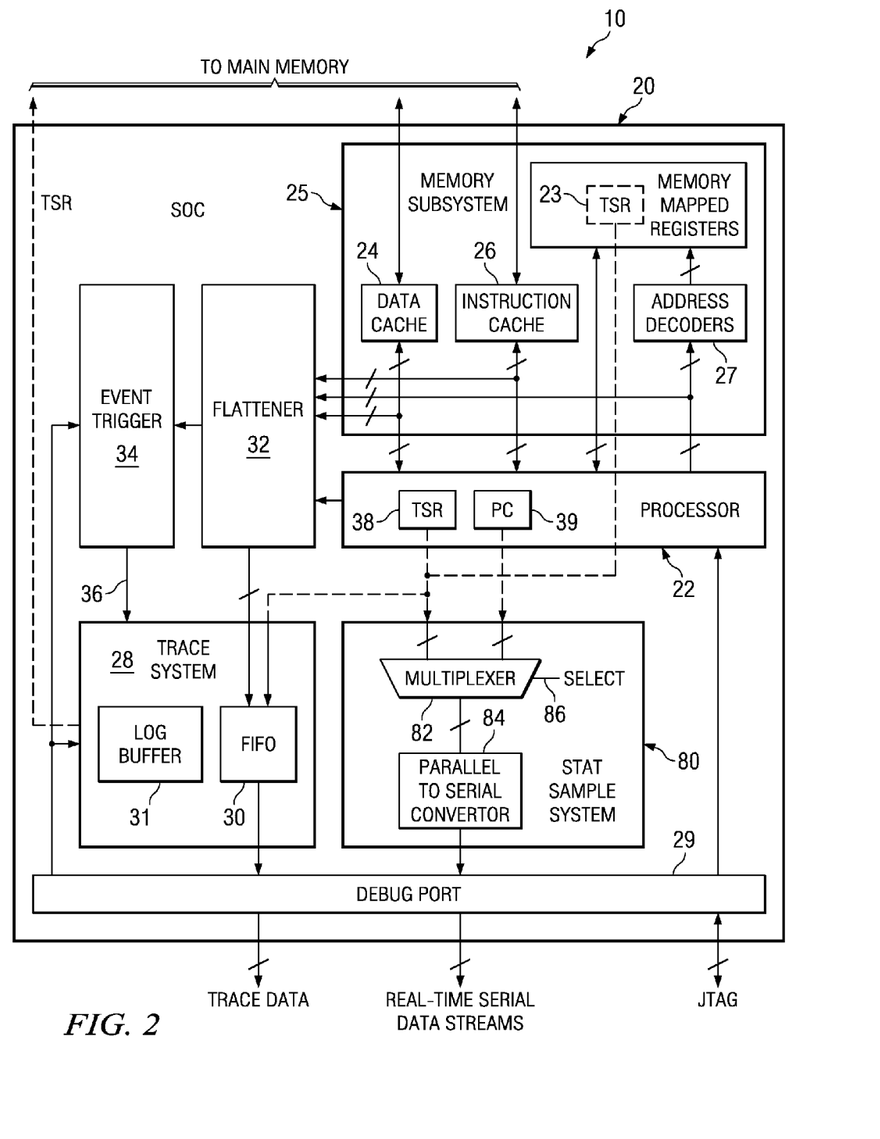
FIG. 2 shows, in greater detail, a target system in accordance with embodiments of the invention.

FIG. 2 shows in greater detail a portion of the target system 10. In particular, a target system 10 in accordance with embodiments of the invention comprises a System-On-A-Chip (SOC) 20. The SOC 20 is so named because many devices that were previously individual components are integrated on a single integrated circuit. For example, the SOC 20 may comprise one or more processors 22, and a memory subsystem 25 that comprises a data cache 24, an instruction cache 26 and an address decoder 27. The SOC 20 may comprise other devices as well, such as random access memory (RAM), and memory controllers. In accordance with embodiments of the invention, the SOC 20 also comprises a trace system 28. The trace system 28 comprises a First In-First Out buffer (FIFO) 30 in which trace data is gathered. The trace data from FIFO 30 is sent to the host computer 12 (FIG. 1) by the trace system 28 through a debug port 29. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; cache memory trace data; addresses of opcodes executed by the processor 22; the value of hardware registers in the processor 22; and interrupts received by the processor 22.

Still referring to FIG. 2, in some embodiments the integrated circuit SOC 20 may further comprise an event trigger system 34. The event trigger system 34 couples to the data flattener 32 and receives a least a portion of the serialized data. In response to various pre-programmed triggers (where such triggers may be communicated to the event trigger system 34 by way of serial communications through the debug port 29), the event trigger system 34 asserts a trigger signal 36 to the trace system 28. In response, the trace system 28 accumulates trace data in its FIFO buffer 30 and sends the trace data to the host computer 12 (FIG. 1).

Referring simultaneously to FIGS. 1 and 2, a user of the host computer system 12 wishing to debug a software program executable on the target system 10 enables the event trigger system 34, possibly by JTAG-based communication over the serial cable 18 or programmed directly by the target system processor 22 itself. Thereafter, the user initiates the target program on the target system 10. The processor 22 executes the target program, while the data flattener 32 gathers pertinent information, serializes the information, and forwards it both the event trigger system 34 and the trace system 28. At points in time before the trace system 28 is enabled by the event trigger system 34, the data supplied to the trace system 28 by the flattener 32 may be ignored, discarded or collected such that the trace data comprises events just prior to the trigger. At a point in execution of the target or traced program, the trigger events occur and the trigger events are identified by the event trigger system 34. The event trigger system 34 asserts the trigger signal 36 to the trace system 28.

In response to assertion of the trigger signal 36, the trace system 28 collects the trace data in the FIFO buffer 30 (possibly together with events that occur prior to the trigger). Simultaneously with collecting, the trace system 28 sends the trace data to the host computer 12. In some embodiments, the trace system 28 sends the trace data over the relatively high bandwidth multi-pin cable 16. Other embodiments comprise sending the data over an optical interconnect to the host computer, over a local area network (LAN) or the Internet, or logging the captured trace data in memory or disk that is accessible by the target processor where it can be accessed by the target processor (e.g., an embedded software debugger). Some of the illustrative trace data may be values indicative of which of a plurality of channels have been operated on by the traced program.

Consider for purposes of explanation a target system 10 executing a traced program that operates on a streaming media having a plurality of channels, some of which operate at a 10 milli-second (ms) frame rate and others of which operate at a 16 ms frame rate. For example, the target system 10 may be a multi-channel voice messaging system, simultaneously recording messages for later playback and playing back messages previously recorded, and designed to support both the G.723 voice codec and a 16 ms sub-band coder. To handle the different frame rate processing, G.723 encoding and decoding activities could be assigned to channels owned by a task that runs every 10 ms, and sub-band coder activities could be assigned to channels owned by a task that runs every 16 ms. Thus, the traced program may have a set of instructions to implement a particular algorithm (e.g., sub-band voice encoding for recording), and the set of instructions may be instantiated multiple times, one each for each sub-band recording channel. Similarly, the target system 10 may be a multi-channel video teleconferencing system compressing digital video and audio for transmission and uncompressing the transmitted video and audio streams for playback. Viewing trace data of the instructions alone it may be difficult to determine which of the channels consumes excessive processor time, especially for channels that are implementing the same algorithms where the instructions are substantially similar across each channel.

In order to assist the user of the debug-trace program 13 in differentiating channels, in some embodiments of the invention the trace system 28 is configured to insert into the trace data values indicative of the channel on which the processor of the target system 10 is operating, and optionally indicative of the task that the channel is operating on. The debug-trace program 13 executing on the host computer 12 extracts the values indicative of the task and channel, which enables the debug-trace program to identify which tasks and channels were operated on in a particular time frame.

Referring to FIG. 2, the trace system 28 obtains the values indicative of the task and channel from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, and referring briefly to FIG. 1, the SOC 20 may couple to a memory subsystem 21 which implements the target state register 23. In these alternative embodiments, the target state register 23 may be readable by a memory operation to an assigned address, and thus target state register 23 may be referred to as a memory addressable register. In yet still other embodiments, the memory subsystem 21 may be integrated with other devices of the SOC 20.

In embodiments where the trace system 28 couples to the host computer 12 by way of the relatively high bandwidth connection, the trace system 28 is configured to monitor the value in the target state register 23, 38 and send the value to the host computer system 12 in a message wrapping protocol that identifies to the host computer 12 that the information is the value of the target state register 23, 38. Thus, in these embodiments the values in the target state register are sent across the high bandwidth cable 16 along with other trace data (e.g., direct memory access (DMA) trace data, cache memory trace data, addresses of opcodes executed by the processor 22 (the program counter values), the value of hardware registers in the processor 22, and interrupts received by the processor 22).

Figure 3:
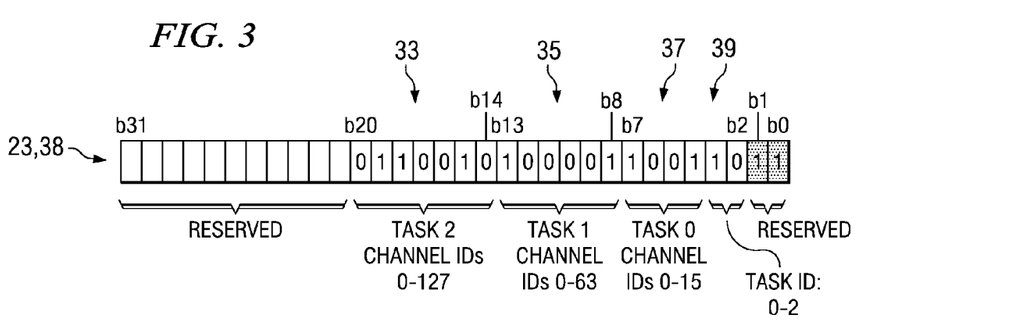
FIG. 3 shows a target state register in accordance with at least some embodiments.

In accordance with at least some embodiments of the invention, the target state register 23, 38, is treated as a set of bitfields, each of which contains independently modifiable information. FIG. 3 illustrates a target state register in accordance with at least some embodiments. In particular, FIG. 3 illustrates the target state register 23, 38 divided into bitfields 33, 35, 37 and 39. Modifying each bitfield is achievable by reading the target state register 23, 38, masking out the bitfield that is to be updated, logical ORing the masked bitfield with the new data and writing it back to the register. Bitfield 39 may be used as the location into which the operating system writes the currently executing task number. The bit-width of bitfield 39 is determined by the number of tasks operated on by the operating system that are profiled. Additionally, tasks that process one or more channels of information are assigned their own bitfield, with the width of the bitfield assigned to each task determined by the maximum number of channels that task will processes. The instructions of the task are instrumented so that whenever the channel number upon which the task is processing changes, the task updates the channel number in its assigned bitfield. When the operating system executes a task switch (possibly preempting execution of another task in the system), the operating system updates the target state register 23, 38 bitfield 39 with a value that is indicative of the newly activated task. Each time the target state register is written to it is sent to the host computer 12 for use by the debug-trace program 13.

In order to address situations where there are a large number of channels, or where the number of bits of the target state register 23, 38 dedicated to identifying the channels are not sufficient to provide bitfields capable of identify all tasks and the associated channels, the operating system writes an indication of the active task and channel to a log buffer. A log buffer may be equivalently referred to as a data table, data array and/or data structure. In some embodiments, data from the log buffer is read out by the host computer 12 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read and cleared by the debug trace program one or more times during the trace period to ensure all the entries generated are available.

In some embodiments, the trace system 28, in addition to the FIFO buffer 30, implements a series of memory locations 31 (FIG. 2) to be the log buffer. In alternative embodiments, the log buffer is located in RAM, either on the SOC 20 or in separate memory subsystem 21 (FIG. 1). Regardless of the precise location of the log buffer, the debug trace program has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention each entry in the log buffer comprises an indication of the identity of the channel and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written by the operating system.

In addition to writing the indication of the identity of the task, channel and possibly the index value in the log buffer 31, the operating system in accordance with embodiments of the invention also places the index value in the target state register 23, 38. Writing the index value to the target state register contemporaneously with writing the log buffer ensures that the index value is present in the trace data associated with the traced program. In accordance with some embodiments, the debug-trace program 13 reads the index value from the trace data, indexes into the log buffer data based on the index value, and thus obtains sufficient information to identify the task and channel upon which the processor operated. The debug-trace program then associates the indicated task and channel context with all subsequent trace data up to the next target state register value or index value that is stored in the trace stream. Attention now turns to how the debug-trace program 13 uses the information regarding identity of the channels.

In software programs operating on multiple channels of a streaming media in real-time, one or more channels may not be able to perform all of the assigned operations in a timely manner. For example, the algorithms used to process a frame of a channel's audio data may take longer than the amount of time allocated to do the work, and the algorithm may either be preempted before the work is completed or delay the processing with respect to other channels of streaming media. A wide variety of problems can result when an algorithm is preempted or overruns the assigned time slice. For example, glitches may be introduced into the media stream for the channel, signal detection algorithms for the channel may fail to work correctly, the performance of other channels of the media stream may be degraded, or the overall system may become unstable. A debug-trace program in accordance with embodiments of the invention uses the values indicative of which of a plurality of tasks and channels are operated on by the target processor to generate and display an indication of a proportion of an execution time the target processor dedicated to each task and channel.

Figure 4:
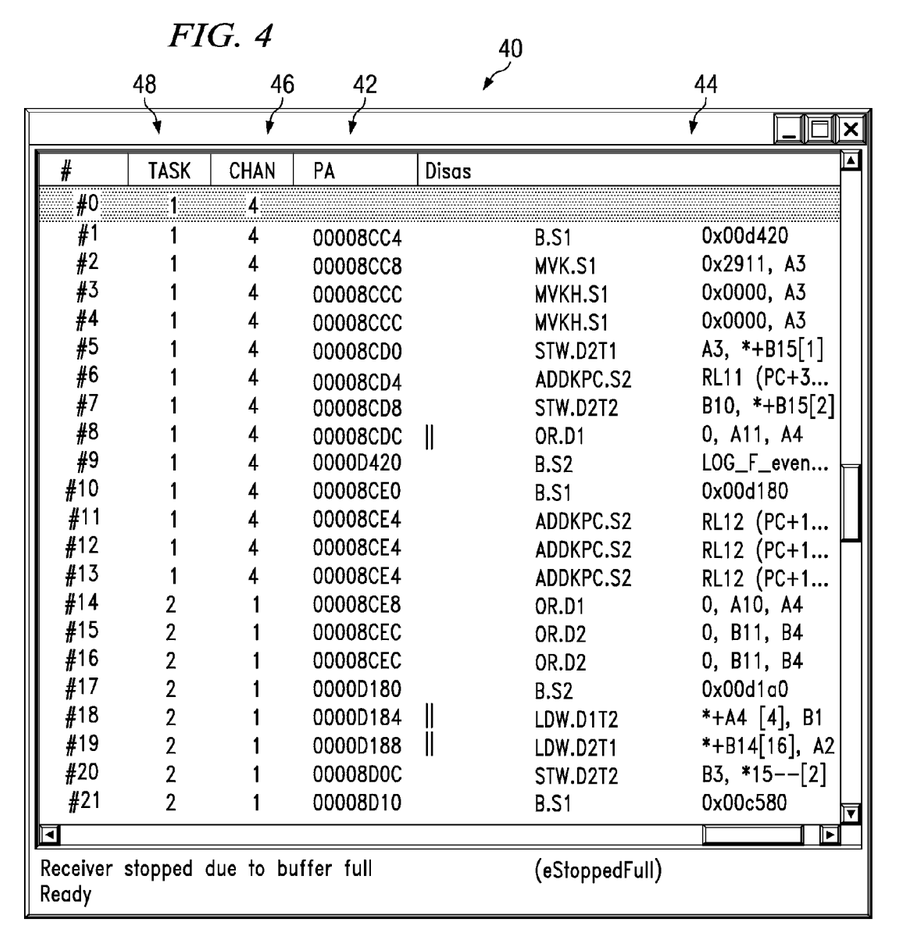
FIG. 4 shows a trace data screen in accordance with some embodiments of the invention.

FIG. 4 shows an illustrative trace data screen 40 that comprises an indication of the proportion of time the target processor dedicated to each channel. In particular, the trace data screen of FIG. 4 illustrates addresses of executed instructions 42, along with disassembly information, such as the opcodes 44 of each instruction, and other information. The opcodes pertaining to each instruction may be determined by the debug-trace program 13 by correlating the addresses sent to the debug-trace program 13 to object files of the traced program. FIG. 4 further illustrates that the debug-trace program 13 may also place in the trace data screen 40 an indication of which channels where being operated on by the instructions at the addresses. In particular, the trace data screen 40 comprises a column 46 which identifies the channel and a column 48 which identifies the task to which the channel belongs. While only four channels and two tasks are identified in the illustrative trace data screen of FIG. 3, any number of tasks and channels may have been operated on and thus may be shown.

Still referring to FIG. 4, for the thirty-two clock cycles illustrated (ignoring any stalls), channel four of task 1 was the active channel for 12 of the clock cycles, channel one of task 2 was active for nineteen of the clock cycles, and channel two of task 2 was active for one clock cycle. Thus, FIG. 4 illustrates the proportion of time the target processor dedicated to each task and channel by the number of entries in columns 46 and 48. In practice, a significantly higher number of clock cycles will be used for each task and/or channel, and FIG. 4 is merely for purposes of illustration. Features of the view of FIG. 4 may comprise: the ability to filter out entries except those for a desired task and/or channel; and allowing the user to view the operation of the software executed by that task and/or channel without having to skip past sections of the trace display where the task and/or channel were either not active or were preempted.

Figure 5:
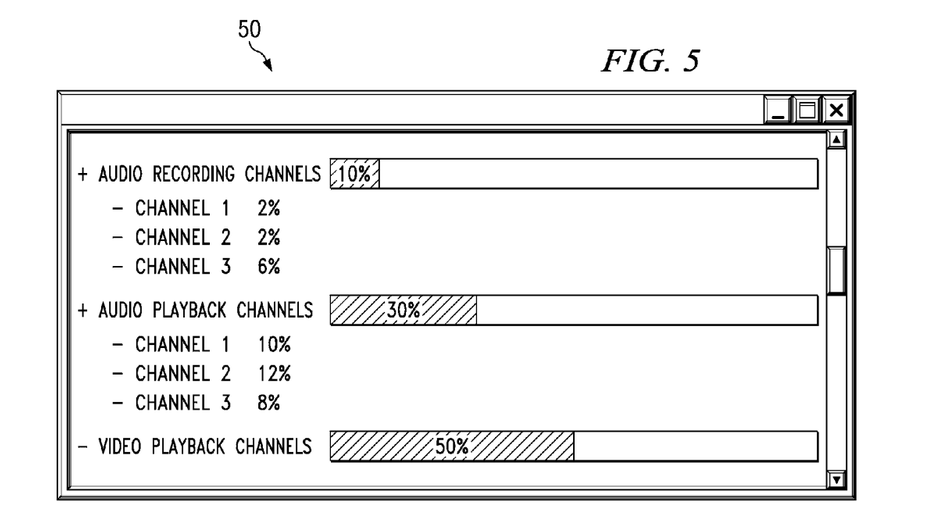
FIG. 5 shows profile screen in accordance with some embodiments of the invention.

FIG. 5 illustrates a profiling screen 50 for a system with three tasks: a first running all audio recording channels, a second running all audio playback channels, and a third running all video playback channels. The profiling screen 50 shows, for an arbitrary time of the traced program, the percentage of the processor time dedicated to each task and each channel within that task. With respect to the task of audio recording channels, audio playback channels and video playback channels, the percentage is shown in a bar graph form (with numerical equivalent embedded therein). The profiling screen also shows that the percentage of time spent on each channel may also be displayed, in this case only by the numerical percentage. In alternative embodiments, all percentages may be shown as bar graphs with embedded numerical percentages, or just as numerical percentages.

Figure 6:
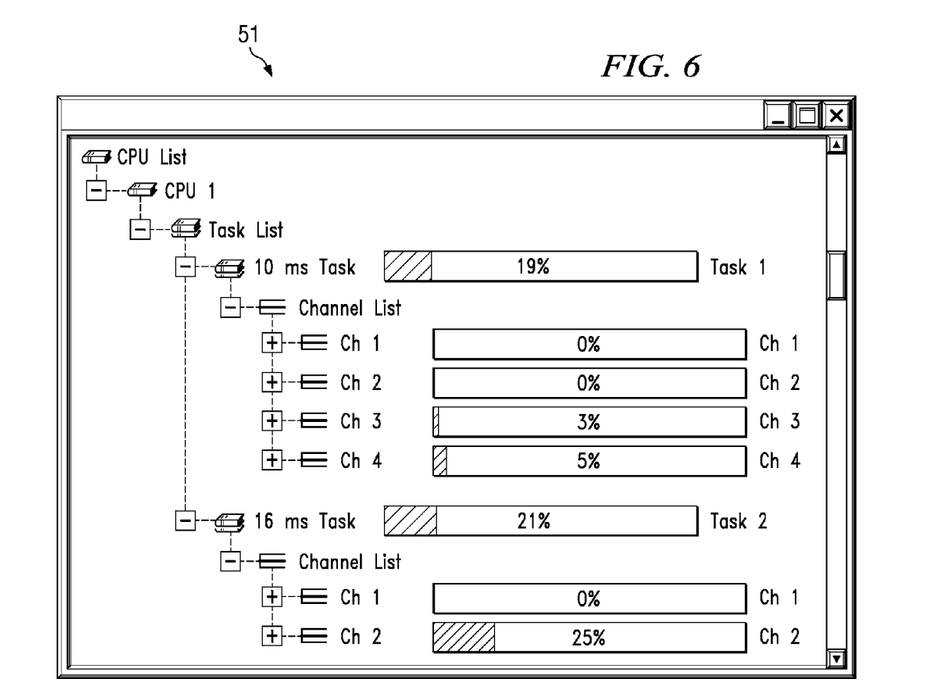
FIG. 6 shows a hierarchical statistical profiling screen in accordance with some embodiments of the invention.

FIG. 6 illustrates yet still other embodiments of a profiling display which is organized as a tree diagram. In particular, FIG. 6 shows a display 51 where the tasks and channels are organized in a tree structure, showing in bar-graph form for each task and channel the percentage of time spent in task and/or channel. A display such as display 51 can be expanded by selecting a particular task and/or channel, and the selection displays a list of all procedures associated with that task and/or channel. The information used to determine how much time was spent by each task and/or channel is determined by correlating the captured trace data and the associated task and channel context information with symbol information associated with the program and software modules that is being executed by the processor.

The embodiments discussed to this point utilize trace data gathered by the trace system 28 and transferred over one or both of serial cable 18 or the multi-pin cable 16; however, in alternative embodiments the SOC 20 either does not have the ability to gather all the pertinent trace data (e.g., a low cost SOC 20 that does not have the trace system 28, data flattener 32 and event trigger system 34), or the user of the debug-trace program 13 is interested in a smaller subset of the data (possibly collected and displayed in real time). Referring again to FIG. 2, in accordance with alternative embodiments the SOC 20 comprises a statistical sample system 80 which enables the alternative embodiments to utilize a method termed herein "statistical profiling."

When statistical profiling, the statistical sample system 80 is configured to periodically read the value of the program counter (which contains the address of the next opcode to execute) from the program counter register 39 and send the value of the program counter to the host computer 12. As discussed above, addresses alone may be insufficient to identify which channel the address of the program counter represents. In order to address this concern, the alternative embodiments send the value in the target state register 23, 38 in place of the value of the program counter when the value (or a portion thereof) in the target state register 23, 38 is newly written with a value indicative of which of a plurality of channels the traced program is about to begin processing.

Referring again to FIG. 2, FIG. 2 illustrates that the statistical sample system 80 comprises a multiplexer 82 and a parallel to serial converter 84. The statistical sample system 80 periodically reads a predetermined read address, in these embodiments the output signals of the multiplexer 82. The reading may be by a direct memory access (DMA) engine within the statistical sample system 80, or the DMA engine may be at some other location on the SOC 20. The value from the predetermined read address is provided to the parallel to serial converter 84, and from there is sent to the host computer 12 (e.g., over the serial cable 18). In some embodiments the statistical sample system 80 may be "programmed" by the debug-trace program 13 to periodically read the predetermined memory location, and thus the debug-trace program 13 from that point forward receives the read values without further commands. In alternative embodiments, the debug-trace program may make a request (or read) for each read value.

Still referring to FIG. 2, and with regard to the value in the target state register 23, 38, the multiplexer of the statistical sample system 80 is configured to provide to the predetermined read location the value of the program counter register 39, unless the value of the target state register 23, 38 (or portion thereof) has changed since the last send of the value of the target state register. If the target state register 23, 38 has been written since the last send of the value of the target state register 23, 38 (e.g., the operating system instantiates operations on a new channel of the streaming media), then the multiplexer select signal 86 is asserted. On the next read of the predetermined memory address, the value of the target state register is present at the output of the multiplexer 82 rather than the program counter value, and thus the host system is supplied the value of the target state register 23, 38. After the read, but before the next read to the predetermined read address, the statistical sample system de-asserts the select signal 86.

Differentiating the program counter value from the value of the target state register in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register, the least significant bit of the value of the target state register is assigned to be a logic "1". Other systems for differentiating program counter values from values of the target state register may be equivalently used.

Using these tools, the debug-trace program 13 may get a statistical sample of values of the program counter during execution of the traced program, and each value of the target state register 23, 38 during the executed program. Each program counter value thus collected may be associated with the task and channel context identified by the last target state register value that was supplied to the debug trace program. The task and channel context associated with each collected program counter can thus be used to qualify whether or not the program counter is included with a set of statistics or not, in the same manner as the qualified trace data entries, and the qualified data similarly can be used to generate statistical profiling information. The program counters may also be correlated with symbol information associated with the program and software modules that are being executed by the traced program in order to determine which software procedure it is associated with. From this information, the debug-trace program 13 builds a display having an indication of a proportion of an execution time of the target processor is dedicated to each task and the channels that belong to it. Although not as exact as the embodiments where each executed address is captured, the embodiments performing statistically sampling still may generate and display indications, such as illustrated in FIG. 5.

In situations where the value indicative of the identity of each channel is written directly to the target state register, these embodiments enable a substantially real time view of the proportion of the execution time the target processor dedicates to each task and channel. In embodiments where the value in the target state register 23, 38 is an index value to a log buffer, the host computer 12 may substantially simultaneously read the log buffer (e.g., log buffer 31), and build the display. In yet still other embodiments, the host computer 12 may read the values at the predetermined read location, but not read the log buffer until after execution of the traced program has stopped, and thus the illustrative displays may be constructed after the host computer 12 has read the log buffer.

Figure 7:
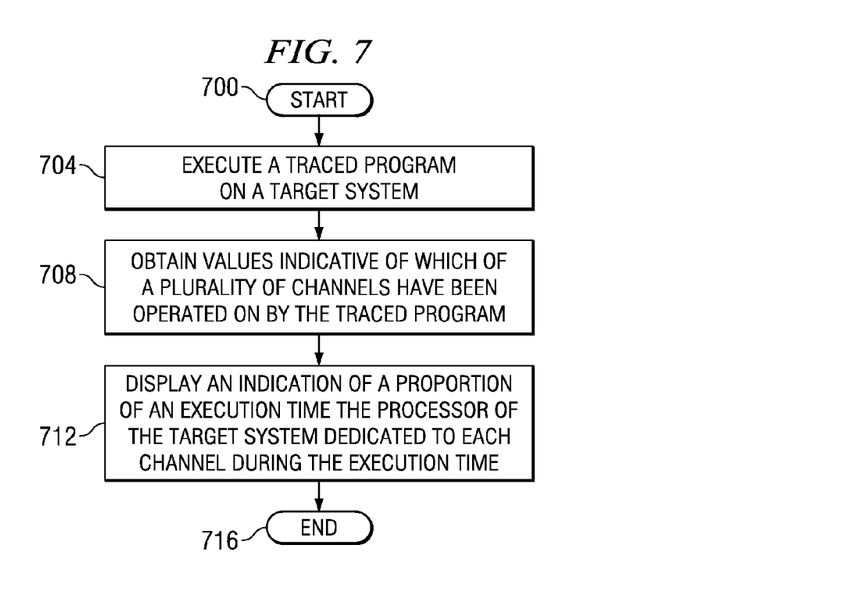
FIG. 7 shows a method in accordance with embodiments of the invention.

FIG. 7 illustrates a method (e.g., software) in accordance with embodiments of the invention. In particular, the process starts (block 700) and proceeds to executing a traced program on a target system (block 704), the traced program operating on a plurality of channels of a streaming media, some of the channels being executed by different tasks than other channels. Thereafter, the method comprises obtaining values indicative of which of the plurality of channels have been operated on by the target system (block 708). In some embodiments, obtaining the values involves extracting those values directly from the trace data sent from the target system 10 to the host computer 12. In other embodiments, the values in the trace data are index values to entries in a log buffer, which log buffer may be read contemporaneously with the execution of the traced program, or after execution has stopped. In yet still other embodiments, obtaining the values indicative of which of the plurality of channels have been operated on involves statistically sampling a predetermined read location, where the read location provides the value of the program counter, unless the value of the target state register has been newly written.

Regardless of the precise mechanism by which the values indicative of which of the plurality of channels have been operated on by the target system, the next illustrative step is displaying an indication of a proportion of an execution time of the target processor was dedicated to each channel (block 712), and thereafter the method ends (block 716). In embodiments where the host computer 12 receives a full set of trace data, displaying the indication may involve creating additional columns in the displayed trace data (such as columns 46 and 48 of FIG. 4) which shows how each executed instruction relates to a channel and task. The embodiments where the values indicative of which of the plurality of channels have been operated on by the target system are delivered as part of the trace data may also generate a display that shows, on a percentage basis, the time dedicated to each channel and task, such as shown in FIGS. 5 and 6. Moreover, embodiments where program counter and target state register are statistically sampled may also generate a display that shows, on a percentage basis, the time dedicated to each channel and task, such as shown in FIGS. 5 and 6.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer readable medium could be, for example, a volatile memory, a non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. For example, although the discussion has assumed that the operating system (in particular the task manager) is responsible for writing the target state register and/or the log buffer, in alterative embodiments the instructions operating on a particular channel may themselves write the pertinent information when executed. It is intended that the following claims be interpreted to embrace all such variations and modifications.

What is claimed is:

1. A computer-readable medium storing a program that, when executed by a processor of a host system, causes the processor to: obtain values indicative of which of a plurality of streaming channels have been operated on by a traced program executing in a target system; and display an indication of a proportion of an execution time the processor of the target system dedicated to each of the plurality of streaming channels during the execution time.

2. The computer-readable medium as defined in claim 1 wherein when the program obtains the values the program causes the processor of the host system to obtain the values indicative of one or more selected from the group: which of a plurality of input streaming data channels have been operated on; or which of a plurality of output streaming channels have been operated on.

3. The computer-readable medium as defined in claim 1 wherein when the program obtains the values the program causes the processor of the host system to obtain the values from trace data sent to the host computer, the trace data captured while the traced program was executing.

4. The computer-readable medium as defined in claim 3 further comprising:
wherein when the program obtains the values the program obtains index values into a log buffer within the traced system; and
wherein the program causes the processor of the host system to:
obtain the log buffer from the target system; identify entries in the log buffer indicated by the index values; and
identify the channels based at least in part on the entries.

5. The computer readable medium as defined in claim 4 wherein when the program obtains values the program causes the processor of the host computer to obtain the values by reading the log buffer one or more times during the execution time.

6. The computer-readable medium as defined in claim 1 wherein when the program obtains the values the program causes the processor of the host computer to periodically receive a value of a predetermined read location within the target system while the traced program is executing, wherein the predetermined read location contains one selected from the group: a value indicative of which of the plurality of channels has been operated on; or a value of the program counter of the processor of the target system.

7. The computer-readable medium as defined in claim 6 wherein when the program periodically receives the value of the predetermined read location, the program causes the host computer to receive an index value into a log buffer.

8. The computer-readable medium as defined in claim 7 wherein the program causes the processor of the host computer to index into a log buffer based on the index value to determine the value indicative of which of the plurality of channels has been operated on.

9. The computer-readable medium as defined in claim 8 wherein the program causes the processor of the host computer to read the log buffer during execution of the traced program.

10. The computer readable media as defined in claim 1 wherein when the program displays the indication the program causes the processor of the host computer to display a graphical representation of a proportion of the execution time dedicated to each of the plurality of channels.

11. The computer readable media as defined in claim 10 wherein when the program displays the indication the program causes the processor of the host computer to display a graphical representation of a percentage of the execution time dedicated to each of the plurality of channels.

12. A method comprising:
executing a traced program on a target system, the traced program operating on a plurality of streaming channels;
obtaining values indicative of which of the plurality of streaming channels the traced program has operated on, the obtaining by a host computer coupled to the target system; and
displaying on a display device an indication of a proportion of an execution time the processor of the target system dedicated to each of the streaming channels.

13. The method as defined in claim 12 wherein executing further comprises execution the traced program operating on the plurality of streaming channels, the streaming channels selected from the group: input streaming data channels; or output streaming channels.

14. The method as defined in claim 12 wherein obtaining further comprises obtaining the values from trace data sent to the host computer, the trace data captured while the traced program was executing.

15. The method as defined in claim 13 wherein obtaining further comprises:
obtaining values from the trace data, each value being an index into a log buffer;
obtaining the log buffer from the target system; and
identifying entries in the log buffer based on the index values, the entries identifying the plurality of streaming channels operated on during the execution time.

16. The method as defined in claim 15 wherein obtaining the log buffer further comprises reading the log buffer one or more times during the execution time.

17. The method as defined in claim 12 wherein obtaining further comprises reading a predetermined read location within the target system while the traced program is executing, the predetermined read location contains one selected from the group: a value indicative the plurality of streaming channels operated on during the execution time; or a value of the program counter of the processor of the target system.

18. The method as defined in claim 17 wherein reading the predetermined read location further comprises reading the predetermined read location over a serial communication pathway.

19. The method as defined in claim 12 wherein displaying further comprises displaying a graphical representation of a proportion of the execution time dedicated to each of the plurality of streaming channels.

20. The method as defined in claim 19 wherein displaying further comprises displaying a graphical representation of a percentage of the execution time dedicated to each of the plurality of streaming channels.

* * * * *

UNITED STATES PATENT AND TRADEMARK OFFICE
CERTIFICATE OF CORRECTION

PATENT NO. : 7,590,892 B2  Page 1 of 1
APPLICATION NO. : 11/383470
DATED : September 15, 2009
INVENTOR(S) : Sohm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-first Day of September, 2010

David J. Kappos
*Director of the United States Patent and Trademark Office*